2,882,211
METHOD OF MINERAL BENEFICATION

Evert A. Autrey, Santa Barbara, Calif.

No Drawing. Application October 12, 1953
Serial No. 385,675

9 Claims. (Cl. 204—157)

This invention relates to a method of mineral benefication and more particularly to a benefication method wherein discoloring impurities in minerals such as clay are treated with chlorine gas at relatively low temperatures.

Although clay is widely distributed in nature, it is usually contaminated with various other minerals, such as iron compounds, which are strongly colored thus rendering the clay unfit for many purposes. It is not practicable to remove such contaminants from clay, for example, by various high temperature treatments because certain valuable properties of clay, which depend upon its colloidal nature, are destroyed by the irreversible reaction which takes place upon loss of water, starting at temperatures of as low at 150° centigrade. The so-called wet methods which call for the use of acid baths or reducing agents such as hyposulfites are expensive, slow, and do not remove sufficient impurities from many minerals and clays to make the end product usable. In the instant invention, the mineral substance is mixed with a small percentage of pulverized sulfur. This mixture is then brought to a temperature of about 100° centigrade and chlorine gas passed therethrough. Since ferric chloride is appreciably volatile at these temperatures it may be removed as formed by displacing it by the gas stream. Finely powdered substances such as clay are preferably grained by dampening slightly with water and mulling in mixing apparatus such as a muller or pug mill after the addition of sulfur and before chlorination.

An object of the invention is to provide a method of cheaply and efficiently bleaching minerals to a high state of brightness.

A second object is to provide a method of purifying and improving clay by the decolorizing of impurities in situ.

A further object is to provide a method of producing and collecting volatile chlorides from inexpensive raw materials.

A still further object is to provide a method of treating clay in a relatively dry condition at temperatures which will not dehydrate clay.

Other objects and many of the attendant advantages of this invention will be readily appreciated as the same becomes better understood by references to the following examples.

*Example I.*—30 grams of air dry clay were put through a 30 mesh screen to remove stones and to break up any lumps that might be present. This raw material had a brightness of 61.0 as determined on a G.E. reflection meter using calcined magnesium oxide, arbitrarily assigned a reflectance value of 100.0, as a standard. The clay was a distinct reddish brown in color and was obviously unfit for many purposes. To this amount of clay, 0.1 gram of powdered sulfur was added and well mixed in. Sufficient water was then added to enable the mixture to be grained into discrete pellets, most of which had a diameter of about 6–8 mm., by rubbing the mixture with a pestle in a porcelain mortar. The grained mixture, which would support a considerable weight without breaking up and which was readily permeated by the gas used for treatment, was placed in a 28 x 200 test tube having a small plug of glass wool on the bottom and a gas inlet tube running down through the test tube and terminating in the glass wool. The test tube was placed in an oven maintained at 100–110° centigrade and chlorine was passed in through the inlet tube and out through the clay. After about 7 minutes the clay had changed to a light yellow color except for a narrow band of clay near the bottom of the test tube. After another three minutes of passing chlorine into the mixture in the darkened oven the entire mixture had changed to the light yellow color. The chlorine which issued from the reaction test tube was passed through a trap in which a reddish yellow liquid giving a strong test for iron collected. The resulting clay product was washed with water to remove water soluble impurities. The wash water gave an acid reaction and the clay was consequently in the flocculated state and easy to wash and filter. The dried clay had a brightness value of 80.5. It was plastic when washed to neutrality and could be dispersed by means of alkalies and other commonly used dispersing and deflocculating agents. A portion of the treated clay was mixed with casein adhesive to form a coating mixture comparable in every way with similar mixtures made up using high grade paper coating clay. The treated clay mixture with adhesive was applied to paper by means of Bird draw down bars to form a number of satisfactory sheets of coated paper.

*Example II.*—The same apparatus and proportions of starting materials were employed as in Example I, but the reactions were permitted to take place in daylight instead of in darkness; the reactions which took place were found to be photosensitive. The changes in color of the crude clay were readily followed. The upper layers brightened first, and the change at any level appeared to be complete before clay lower in the test would be appreciably brightened. The entire mixture had changed to a light yellow color in less than five minutes. The treated clay, after washing and drying, had a brightness of 80.3.

*Example III.*—Approximately 15 grams of clay chlorinated according to the procedure given under Example I but unwashed with water was extracted with ethyl acetate. The extraction was carried out by means of Sohxlet apparatus, and the final brightness value attained was 82.1. Similar extractions on separate samples of chlorinated but unwashed clay with isopropyl ether, ethanol, acetone, and methanol produced a product having a brightness range of from 81.1 to 81.7.

The mechanism of the reactions which take place in the bleaching process is not understood. The effectiveness of the bleaching action is thought to be due to the formation in situ of strongly reactive, short lived compounds which promote the low temperature chlorination of impurities and which are particularly effective due to the intimate mixture of the particles of clay and impurites with sulfur and the freedom with which the gaseous chlorine can enter the permeable pellets. The increase in bleaching action brought about by light is probably due to increased rate of the various reactions by which the transitory compounds are formed.

The proportion of sulfur required for mixing with the minerals varies with the percentage and nature of the impurities present. Badly stained clay having iron compounds as the major discoloring impurity may be brightened greatly with as little as 0.1% sulfur based on the weight of air dry clay although still better results are obtained with increased amounts of sulfur up to about 3% at which point further increases in the percentage of sulfur used result in very slight increases in brightness. The amount of chlorine required may be determined by simply observing the course of the reaction and allowing chlorine gas to flow in until the mixture ceases to brighten further. Ferric chloride is appreciably volatile at 100° centigrade and may be displaced from the reaction mixture by continuing the current of chlorine gas or by blowing warm air through the mixture after chlorination of impurities has taken place. The excess chlorine which is not taken up within the reaction mixture may be recycled after passing it through a cold trap to remove volatile impurities, such at ferric chloride, which may thus be recovered as valuable by-products. Any sulfur remaining in the mixture after chlorination may be removed through the use of solvents or by flotation. This separation problem is not present unless relatively large amounts of sulfur are added to the clay before introduction of the chlorine gas; for many purposes the presence of sulfur in small amounts is not harmful. The amount of water used does not appear to be critical. A desirable amount of water is that permitting the formation of a mixture which cakes like foundry molding sand when a handful is squeezed. In addition to providing the proper consistency of the mixture so that it may be grained, the presence of water seems to be desirable in order that the decolorizing reaction takes place with speed and completeness.

Obviously many modifications and variations of the present invention are possible in the light of the above teachings. It will be understood that the material to be brightened and the material to be removed therefrom need not be restricted to clay and the impurities naturally associated therewith but may be any substances, either found naturally or resulting from a manufacturing process, relatively inert to the action of the reagents above listed along with impurities or desired products which are reactive with the reagents above listed and which may be removed from the relatively inert substance by the simple, economical treatment described herein. It is therefore to be understood that within the scope of the appended claims the invention may be practiced otherwise than as specifically described.

What is claimed is:

1. A method of treating clay containing discoloring impurities, comprising mixing therewith powdered sulfur in an amount from 0.1 to 3% based on the weight of clay, adding water to the mixture of clay and sulfur in an amount sufficient to result in the formation of permeable, discrete granules when mulled, passing chlorine gas through said granules at a temperature below about 150° centigrade, and finally removing water soluble impurities from the chlorinated mixture by washing with water.

2. The method of removing impurities from clay, comprising mixing about 1000 parts of clay with about 1 part by weight of sulfur, mulling the clay and sulfur with the addition of water to form pellets permeable to a gas, heating said pellets to a temperature in the range of about 90° and 150° centigrade, passing chlorine gas through said heated pellets until chlorine is no longer taken up by said impurities, and removing water soluble impurities from the clay by washing with water.

3. A method of chlorinating iron compounds in moistened clay comprising intimately mixing sulfur with said clay and passing chlorine gas through the mixture at a temperature below about 150° centigrade.

4. In a process for the manufacture of ferric chloride from mixtures of minerals including iron oxides, the steps comprising blending finely divided sulfur with said mixtures, moistening the combination of said sulfur and said mixtures, passing an excess of chlorine gas through the resulting blend maintained at a temperature of about 100° centigrade, and removing ferric chloride from the unreacted chlorine gas.

5. A process for chlorinating mineral substances at a temperature below that causing the irreversible loss of water from clay, comprising mixing more than 0.1% and not more than about 3% by weight of comminuted sulfur with the comminuted mineral substance and water to form a pelletable mixture and passing chlorine gas through the resulting mixture.

6. In the production of clay having a high brightness value from raw clay stained with iron oxides the steps comprising mixing said clay with not less than about 0.1% and not more than about 3% by weight of finely divided sulfur, graining the resulting mixture with the addition of sufficient water to form pellets permeable to a gas, introducing said pellets into a reaction chamber transparent to light, heating said pellets to a temperature between 90° and 150° centigrade, passing gaseous chlorine through said reaction chamber effective to contact said pellets while irradiating said reaction chamber with light, sweeping off volatile compounds by means of a stream of excess chlorine gas, and washing the resulting product with water to remove soluble compounds.

7. In the production of clay having a high brightness value from raw clay stained with iron oxides the steps comprising mixing said clay with not less than about 0.1% and not more than about 3% by weight of finely divided sulfur, graining the resulting mixture with the addition of sufficient water to form pellets permeable to a gas, introducing said pellets into a reaction chamber transparent to light, heating said pellets to a temperature between 90° and 150° centigrade, passing gaseous chlorine through said reaction chamber effective to contact said pellets while irradiating said reaction chamber with light, sweeping off volatile compounds by means of a stream of excess chlorine gas, and washing the resulting product with a solvent taken from the group consisting of ethyl acetate, isopropyl ether, ethanol, acetone, and methanol.

8. The method of preparing a mineral for treatment with chlorine to produce chlorides which comprises mixing together the mineral in finely-divided form, sulfur in a finely-divided form, and water so as to form a pelletable mixture, and mulling the so obtained mixture to form discrete, mechanically strong, gas permeable pellets.

9. The method of making ferric chloride which comprises forming a mixture comprising a finely-divided clay containing ferric oxides finely-divided sulfur and water sufficient to form pellets, and reacting the resulting mixture with chlorine gas at a temperature of about 100° centigrade.

References Cited in the file of this patent

UNITED STATES PATENTS

| 1,994,367 | Millar et al | Mar. 12, 1935 |
| 2,070,161 | Flinn | Feb. 9, 1937 |
| 2,161,045 | Hirschkind et al. | June 6, 1939 |
| 2,238,103 | Fink et al. | Apr. 15, 1941 |
| 2,596,609 | Shabaker | May 13, 1952 |

OTHER REFERENCES

Hackh's "Chemical Dictionary," 2nd ed., pp. 229 and 230, Blakiston's Sons and Co., Inc., Philadelphia, Pa.

Hackh's "Chem. Dictionary," 2nd ed., pp. 937 and 373, Blakiston's Son and Co., Inc., Philadelphia, Pa.

Lange's "Handbook of Chem.," 1944 ed., pages 188–189, published by Handbook Publishers, Inc., Sandusky, Ohio.